Patented Dec. 15, 1925.

1,565,736

UNITED STATES PATENT OFFICE.

LOUIS HAAS, OF PARIS, FRANCE, AND EMIL REBER, OF BASEL, SWITZERLAND, ASSIGNORS TO SOCIETY OF CHEMICAL INDUSTRY IN BASLE, OF BASEL, SWITZERLAND.

BLUISH SULPHURIZED INDOPHENOL-BENZIDINE DYE AND PROCESS OF MAKING THE SAME.

No Drawing. Application filed May 7, 1923. Serial No. 637,322.

*To all whom it may concern:*

Be it known that we, LOUIS HAAS, of Paris, France, and EMIL REBER, of Basel, Switzerland, the first a citizen of the Republic of France, and the second a citizen of the Republic of Switzerland, have invented new and useful Bluish Sulphurized Indophenol-Benzidine Dyes and Process of Making the Same, of which the following is a full, clear, and exact specification.

It is known that very valuable dyestuffs are obtained by treating with sulphur and alkali metal polysulphides the leuco-derivatives of the indophenols which are obtained by condensation of nitrosophenols with carbazole.

The literature concerning these sulphur dyes mentions that the best results are obtained by a slow sulphuration at low temperature and in presence of alcohol.

We have found that, in contradistinction to the process with alcohol, a rapid sulphuration gives also very valuable new dyes in a good yield if the sulphuration of these leuco-indophenols takes place at higher temperature and in presence of benzidine which enters the dyestuff molecule, with or without addition of a fusing agent, as for instance, a phenol or a naphthol. These new dyestuffs may be dyed in a sodium sulphide or sodium hydrosulphite bath. They produce on the vegetable fibre beautiful blue shades with indigo-like greenish reflexes very fast to washing to light and to chlorine.

Example 1.

27, 2 parts of the indophenol obtained by condensation of nitrosophenol with carbazole are introduced into the molten mixture of 29 parts of crystallized sodium sulphide and 36 parts of pulverized sulphur and stirred until the indophenol is completely reduced. The whole mass is then dried in a vacuum, pulverized and well mixed with 9, 2 parts of benzidine. The mixture thus obtained is baked at 180-190° C. until no more hydrogen sulphide is developed.

After cooling the product is finely ground and extracted with a dilute solution of sodium sulphide to eliminate sulphur and other impurities.

The dry dyestuff dyes cotton in blue shades with indigo like reflexes, very fast to washing, to light, and to chlorine.

Example 2.

27, 2 parts of the indophenol obtained by condensation of nitrosophenol with carbazole are introduced into the molten mixture of 29 parts of crystallized sodium sulphide and 20 parts of sulphur. The mass is stirred until the indophenol is reduced, dried in the vacuum, pulverized and well mixed with 18, 4 parts of benzidine and 30 parts of sulphur; it is then heated at 180-190° C. until no more hydrogen sulphide is developed.

The baked product is treated as is described in the first example. The dyestuff thus obtained is very like the coloring matter described in the preceding example.

Example 3.

27, 2 parts of the indophenol obtained by condensation of nitrosophenol with carbazole are introduced into the molten mixture of 29 parts of crystallized sodium sulphide, 36 parts of pulverized sulphur and 9, 2 parts of benzidine. The mass is stirred until the indophenol is reduced, vacuum dried, pulverized and well mixed with 8 parts of phenol. Then the product thus obtained is heated to about 180° C. until no more hydrogen sulphide is developed, and treated as described in the preceding examples.

Example 4.

27, 2 parts of the indophenol obtained by condensation of nitrosophenol with carbazole are introduced into a mixture of 42 parts of crystallized sodium sulphide, 44 parts of sulphur. 4.9 parts of benzidine and 4.6 parts of α-naphthol. The whole is stirred until the indophenol is completely reduced, and treated as described in the preceding examples.

Instead of phenol and α-naphthol other substances, as for example, β-naphthol, resorcin, etc., may be used. The dyestuffs thus obtained are very like those described in the preceding examples.

What we claim is:

1. The process of making new dyes containing sulphur which consists in sulphurizing the leuco-derivatives of the indophenols obtained by condensation of nitrosophenols with carbazole in presence of benzidine.

2. The process of making new dyes containing sulphur which consists in sulphurizing the leuco-derivatives of the indophenols obtained by condensation of nitrosophenols with carbazole in presence of benzidine and of a fusing agent.

3. The process of making new dyes containing sulphur which consists in sulphurizing the leuco-derivatives of the indophenols obtained by condensation of nitrosophenols with carbazole in presence of benzidine and phenol.

4. The new dyestuffs obtained by sulphurizing the leuco-derivatives of the indophenols obtained by condensation of nitrosophenols with carbazole in presence of benzidine, constituting in a dry state dark blue powders insoluble in water, soluble in concentrated sulphuric acid with blue colorations, producing with sodium hydrosulphite and caustic soda yellow vats, and with alkali metal sulphides greenish vats, which dye the vegetable fibre in blue shades very fast to washing, to light, and to chlorine.

In testimony whereof, we have hereunto set our hands.

Paris, this 19th day of April 1923.

LOUIS HAAS.

Basel, this 23d day of April 1923.

EMIL REBER.